(12) United States Patent
Grundvig

(10) Patent No.: US 7,076,260 B1
(45) Date of Patent: *Jul. 11, 2006

(54) UNBALANCED CODING FOR CORDLESS TELEPHONY

(75) Inventor: Jeffrey Paul Grundvig, Macungie, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/532,020

(22) Filed: Mar. 21, 2000

(51) Int. Cl.
*H04Q 7/20* (2006.01)

(52) U.S. Cl. ............... 455/462; 455/465; 379/428.02; 379/399.02; 704/212; 704/230

(58) Field of Classification Search ............... 455/462, 455/465, 74.1; 379/428.02, 399.02; 370/276; 704/212, 230, 500, 501, 503, 504
See application file for complete search history.

(56) References Cited

U.S. PATENT DOCUMENTS

| | | | |
|---|---|---|---|
| 5,528,623 A * | 6/1996 | Foster, Jr. .................... | 375/133 |
| 5,706,282 A * | 1/1998 | Chung ......................... | 370/280 |
| 5,722,086 A * | 2/1998 | Teitler et al. ................ | 455/561 |
| 5,812,951 A * | 9/1998 | Ganesan et al. ............. | 455/445 |
| 6,343,217 B1 * | 1/2002 | Borland ....................... | 455/462 |
| 6,597,702 B1 * | 7/2003 | Caugherty ................... | 370/410 |

* cited by examiner

*Primary Examiner*—Temica Beamer

(57) ABSTRACT

In a digital cordless telephone system, a different speech coding scheme is used in the audio path from the base unit to its remote handset than that which is used in the audio path in the opposite direction from the remote handset to the base unit. It is found that this unbalanced coding scheme optimizes overall system cost and performance. In particular, two different types, quality and/or bit rates of speech encoders are implemented in opposite directions of the same full-duplex audio path, providing an unbalanced coding in a digital cordless telephone. Implementation of different types of speech encoders in a common full duplex path optimizes system cost and performance. It is recognized by the invention that the communications link in a first direction from a base unit to its remote handset in a digital cordless telephone system potentially requires better codec and audio performance than the communications link in the opposite direction from the remote handset to base unit. Accordingly, to provide maximum efficiency and cost utilization, a digital cordless telephone system architecture and method provides a better speech coder in terms of quality in the base unit to remote handset direction of the communications link.

27 Claims, 5 Drawing Sheets

FIG. 2A

| EXAMPLE | ENCODER/DECODER TYPES |
|---|---|
| CELP | |
| RELP | |
| μ LAW | |
| A-LAW | |
| PCM | |
| ADPCM | |

FIG. 2B

| EXAMPLE | ENCODER/DECODER TYPES | |
|---|---|---|
| 24 | Kb/s | CELP |
| 32 | Kb/s | CELP |
| 64 | Kb/s | μ LAW |
| 32 | Kb/s | ADPCM |

UNBALANCED CODING FOR CORDLESS TELEPHONY

BACKGROUND OF THE INVENTION

1. Field of the Invention

This invention relates generally to digital cordless telephones. More particularly, it relates to improved techniques and apparatus for communication of voice data between a base and a remote handset of a digital cordless telephone.

2. Background of Related Art

Digital cordless telephones are popular consumer devices which allow a user in a home or office the freedom to stray hundreds of feet from a base unit. Initially, remote handsets of cordless telephones communicated with their base unit using analog signals. In more recent years, advancements have been made with respect to cordless telephones allowing digital communications between the remote handset and its base unit. The entry of cordless telephones into digital communications generally provides better voice quality because of increased noise rejection, and a somewhat higher range.

FIG. 3 shows relevant features of a conventional digital remote handset of a digital cordless telephone. In FIG. 3, the remote handset of a digital cordless telephone includes a processor (e.g., a digital signal processor (DSP), microprocessor, or microcontroller) 550 comprising a transmitter baseband processor portion 500 and a receiver baseband processor portion 600.

In the transmit direction, a microphone 590 outputs an analog signal to a COder/DECoder (CODEC) 580, which converts the microphone input signal to a digital microphone signal.

The digital microphone signal is encoded into a compressed digital signal and processed by the transmitter baseband processor 500. The compressed digital signal is transmitted by a radio frequency (RF) transmitter 570 and an antenna to a complementary base unit 561.

In the receive direction, an antenna and RF receiver 572 receives a digital signal from the complementary base unit 561. The RF receiver 572 passes the digital signal to a receiver baseband processor portion 600 and decoder 581 for decoding. The decoded digital signal is converted back to analog for output by a speaker 592.

The codec 580 includes an appropriate encoding scheme for use in one direction of a full-duplex audio link, as well as an appropriate decoding scheme for use in the opposite direction of the full-duplex audio link. The encoding scheme utilizes the same algorithm as the decoding scheme, just in an opposite direction. For instance, the codec 580 may provide 32 kb/s adaptive differential pulse code modulation (ADPCM) encoding and decoding. Or, a codec 580 may be selected which provides 64 kb/s μlaw encoding and decoding, or 3.6 kb/s CELP encoding and decoding, or 2.4 kb/s CELP encoding and decoding, etc.

FIG. 4 shows the codec 580 in more detail.

In particular, as shown in FIG. 4, each codec 580 (both in the remote handset 560 as well as in the base unit 561) includes an analog-to-digital (A/D) converter 582 and encoder 300 in a first audio path direction, and a decoder 400 and digital-to-analog (D/A) converter 583 in an opposite audio path direction. The audio paths may be output separately, or sequentially (e.g., using time slots) through an appropriate I/O device 307.

Generally speaking, the encoder 300 is driven by an appropriate encoding algorithm, e.g., a CELP module 309a, and the decoder 400 is similarly driven by a corresponding decoding algorithm, e.g., CELP module 309b.

Thus, the base unit of a digital cordless telephone system contains encoding and decoding circuitry which is complementary to that contained in a matching remote handset. In either or both the remote handset and/or its base unit, the transmitter and receiver baseband processor portions may be comprised within the same processor, e.g., the same DSP.

The particular encoding and decoding techniques used by encoder 300 and decoder 400 are typically toll-quality. For instance, either 8-bit linear pulse code modulation (PCM), μ-law, A-law, or adaptive differential pulse code modulation (ADPCM) are often used to compress digital speech messages transmitted in both directions between a base and its handset (i.e., from the base unit to its remote handset, and from the remote handset to its base unit).

One commonly used speech encoding/compression algorithm is code excited linear predictive (CELP) based coding. CELP-based algorithms reconstruct speech signals based on a digital model of the human vocal tract. They provide frames of an encoded, compressed bit stream and include short-term spectral linear predictor coefficients, voicing information and gain information (frame and sub frame-based) reconstructable based on a model of the human vocal tract. Whether speech compression can or should be employed often depends on the desired quality of the speech upon reproduction, the sampling rate of the real-time speech, and the available processing capacity to handle speech compression and other associated tasks on-the-fly before storage to voice message memory. CELP bit rates vary, e.g., up to 6.8 Kb/s or more.

In designing a digital cordless telephone, one particular type of encoding and decoding at one particular encoding/decoding bit rate is chosen and fixed by design into the relevant codec block of both the remote handset 560 and the base unit 561.

FIG. 5 shows a real-time speech signal 402 with respect to a noise level 400 determined by a conventional, real-time, time domain-based speech analysis. The noise level 400 represents the maximum desired level of background noise or other unwanted information in speech signal 402. Noise in the real-time speech signal 402 can be a result of many causes, such as audible background noise digitized with the original speech signal at a remote handset, and/or digitization noise caused by the encoding and decoding process itself.

Real-time speech is input to speech encoder 302 for compression into CELP frames. Typical digital encoding techniques, e.g., ADPCM or CELP, raise the noise floor of the digitized speech signal, which either reduces overall sound quality, or demands high performance codec technology for use in both directions to ensure good sound quality. Conventional techniques may use of a dual-direction codec, i.e., COder and DECoder (CODEC), or coding and decoding may be implemented in an appropriate software module processing digitized samples of a voice data stream. In any event, conventional techniques and apparatus utilize the same speech grade coding/decoding in both directions of the full duplex communications between a base unit and its remote handset of a conventional digital cordless telephone.

Accordingly, there is a need for an improved technique and apparatus which avoids the wasted additional cost of providing a higher performance coder/decoder in one direction of a voice communication path of a digital cordless telephone, particularly when only one direction has degraded the overall performance of a full duplex voice communication link.

SUMMARY OF THE INVENTION

In accordance with the principles of the present invention, in a digital cordless telephone system, a full-duplex audio path between a base unit and a remote handset comprises an unbalanced coding scheme wherein digital audio transmitted in a first direction over the full-duplex audio path is encoded using a first encoding scheme different from a second encoding scheme used to encode digital audio transmitted over the full-duplex audio path in a second direction opposite the first direction.

In accordance with another aspect of the present invention, a digital cordless telephone system comprises a base unit having an audio encoding scheme of a first type, and a remote handset having an audio encoding scheme of a second type different from the first type.

A method of providing an unbalanced coding scheme in a digital cordless telephone in accordance with yet another aspect of the present invention comprises providing a first radio frequency bandwidth for transmission of encoded digitized audio data from a base unit to a corresponding remote handset. A second radio frequency bandwidth different from the first radio frequency bandwidth is provided for transmission of encoded digitized audio data from the remote handset to the base unit.

BRIEF DESCRIPTION OF THE DRAWINGS

Features and advantages of the present invention will become apparent to those skilled in the art from the following description with reference to the drawings, in which:

FIG. 2A is a table listing exemplary encoding schemes, selected in accordance with the principles of the present invention.

FIG. 2B is a table listing exemplary encoding schemes including different bit rates utilizing a same encoder type, selected in accordance with the principles of the present invention.

DETAILED DESCRIPTION OF ILLUSTRATIVE EMBODIMENTS

Figure 1:
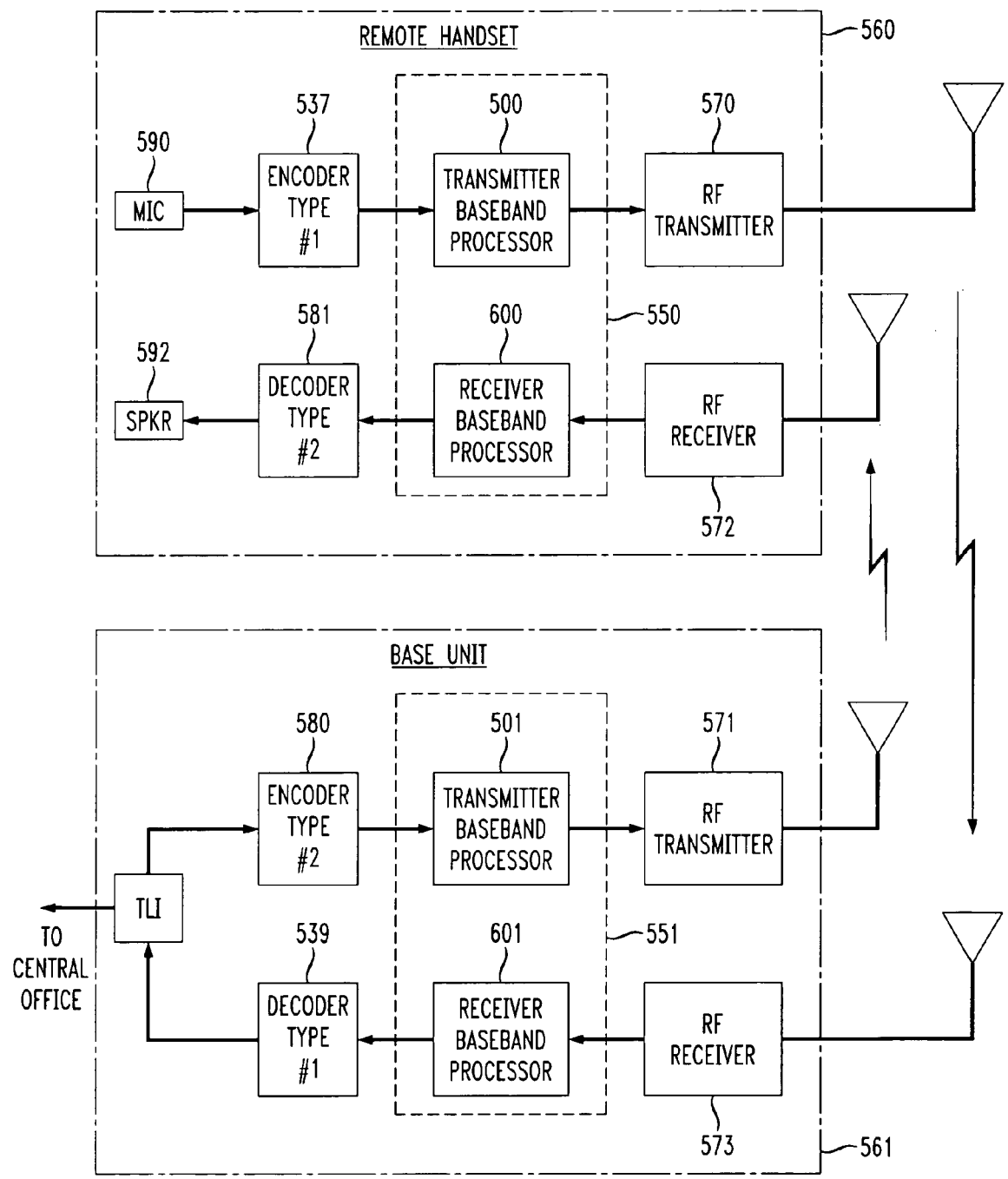
FIG. 1 shows an exemplary digital cordless telephone including a base unit and a corresponding remote handset, including an encoding scheme of a first type and/or bit rate in the remote handset (with a corresponding decoder in the base unit), and an encoding scheme of a second type and/or bit rate in the base unit (with a corresponding decoder in the remote handset, in accordance with the principles of the present invention.
Figure 3:
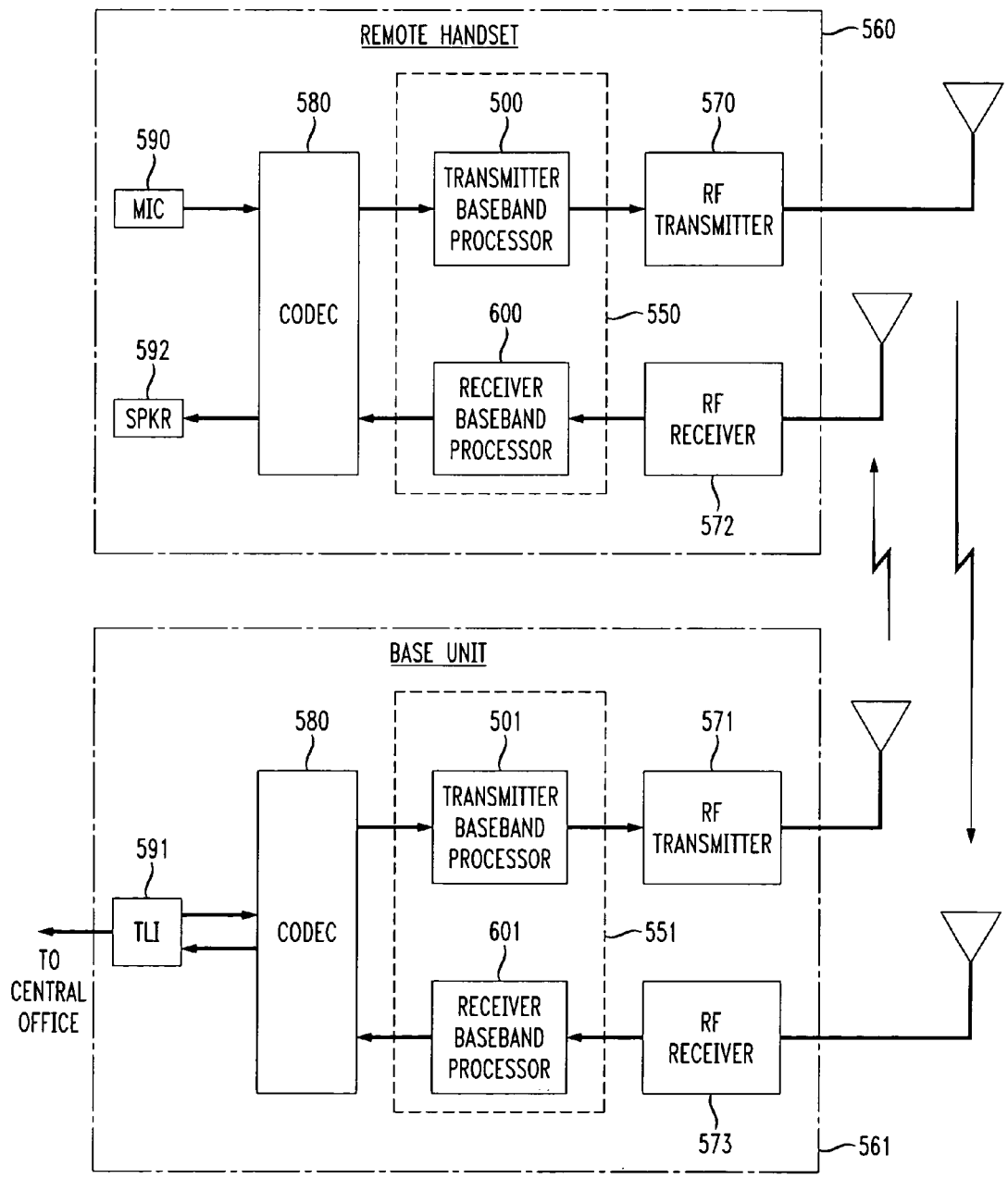
FIG. 3 shows relevant features of a conventional digital remote handset of a digital cordless telephone.
Figure 4:
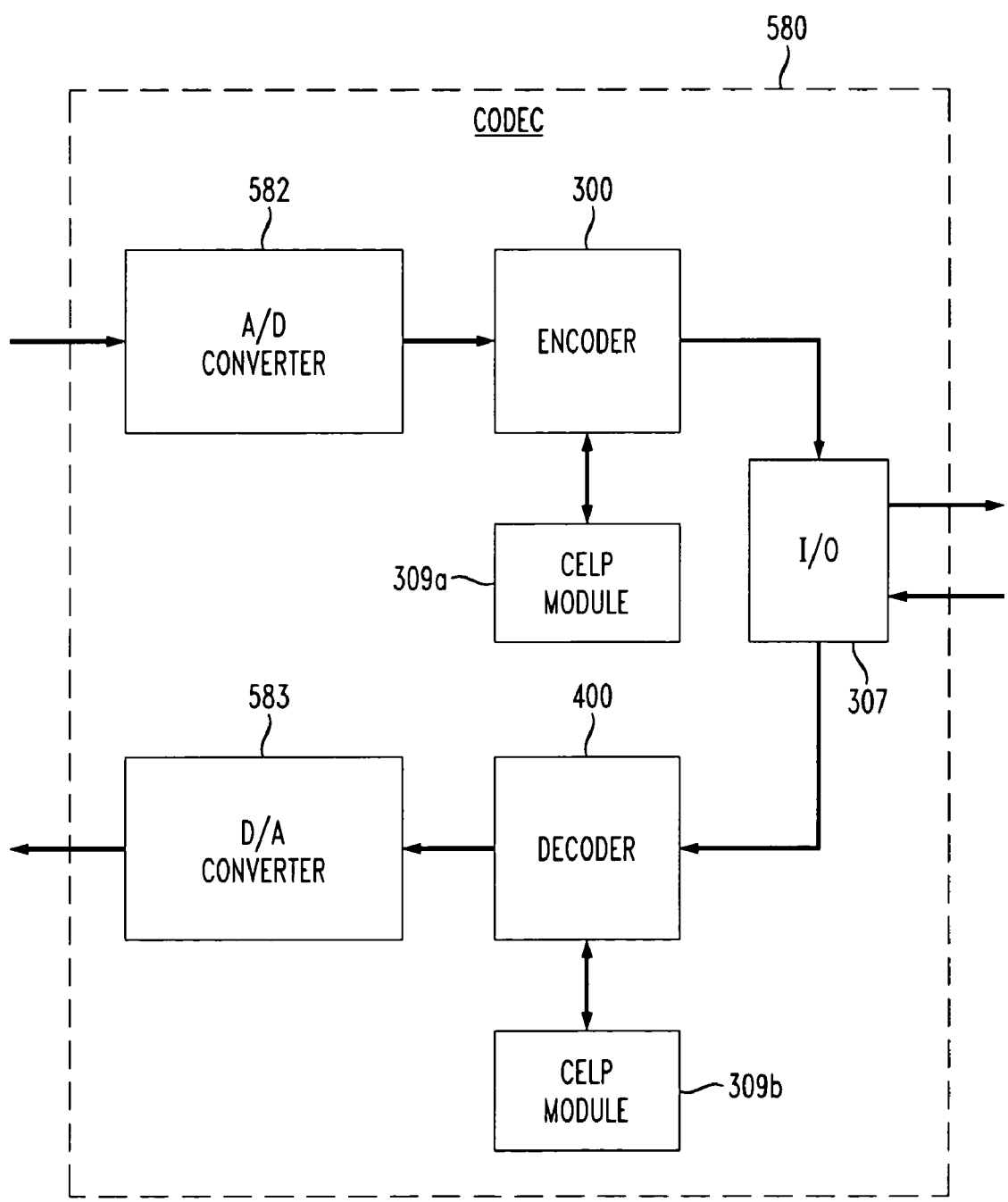
FIG. 4 shows relevant features of a conventional transmitter baseband processor in a conventional digital remote handset of a digital cordless telephone shown in FIG. 3.
Figure 5:
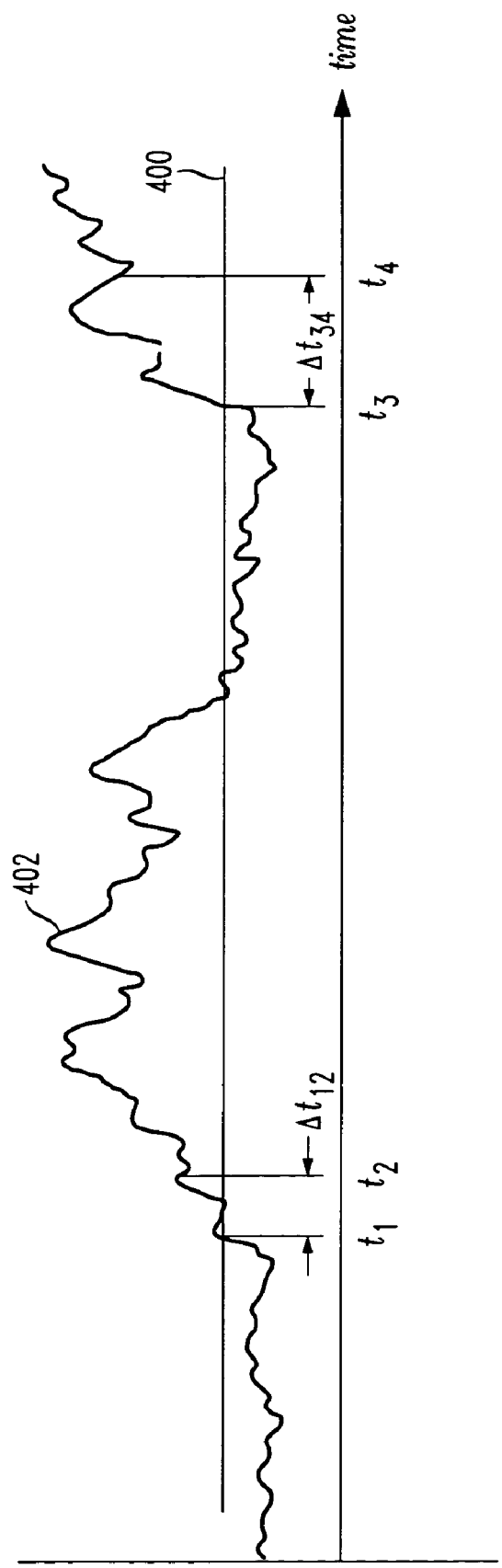
FIG. 5 shows relevant features of a conventional receiver baseband processor in a conventional digital remote handset of a digital cordless telephone shown in FIG. 3.

In accordance with the principles of the present invention, in a digital cordless telephone system, a different speech coding scheme is used in the audio path from the base unit to its remote handset than that which is used in the audio path in the opposite direction from the remote handset to the base unit. It is found that this unbalanced coding scheme optimizes overall system cost and performance.

In particular, the present invention relates to the implementation of two different types of speech encoders for encoding voice data transmitted between a base unit and its remote handset of a digital cordless telephone. Implementation of different types of speech encoders in a common full duplex path optimizes system cost and performance.

In a digital cordless telephone, a full-duplex communications link is formed between a base unit and its remote handset. However, the present inventor appreciates that the communications link in the direction between a base unit and its remote handset in a digital cordless telephone system potentially requires better codec and audio performance than the communications link in the direction from the remote handset to base unit. Accordingly, to provide maximum efficiency and cost utilization, a digital cordless telephone system architecture and method provides a better speech coder in terms of quality in the base unit to remote handset direction of the communications link.

The base unit to remote handset audio link in a digital cordless telephone may require better codec and audio performance than the audio link in the opposite direction, for example, because:

1. The remote handset receiver typically includes a volume control capability which raises the background noise as the volume level is increased. This may cause a user of the remote handset to think that they have a noisy product when they are using higher volume settings. The base unit transmit audio however typically is set at one fixed volume level and therefore the background noise will be fixed in the direction from the base unit to the remote handset.

2. The audio path in the direction from the base unit to the remote handset comes from a telephone line interface (TLI) input, which is coupled to a TLI output. Therefore, the dynamic range which must be allowed for at the input to the codec in the base unit may be set by the TLI output signal which is reflected back to the input. When this is the case, the desired input may appear at the codec input at a lower level than a maximum level which reduces a signal-to-noise ratio (SNR) of the desired signal going from the TLI input to the speaker of the remote handset. This problem doesn't exist in the output path from the microphone of the remote handset to the line output path. This can make the output path from the TLI input to the remote handset sound worse, even when the same codec and speech coder are being used in both directions.

3. It might also be possible that there is a reduced system requirement for audio quality from the remote handset to the line output because the user doesn't hear their outgoing voice, and may not complain or return their product because of that lower quality audio output by their device.

Accordingly, a digital cordless telephone system may be improved with respect to performance and/or cost by providing different codecs in any or all of the following manners, all of which have the effect of improving the overall cost and quality balance by providing for an improved coder or codec in the direction from the base unit to the remote handset as compared to the audio quality in the opposite direction from the remote handset to the base unit.

Technique #1—Increased Audio Bandwidth from Base to Remote

Utilize additional radio frequency (RF) bandwidth for the audio link in the direction from the base unit to the remote handset than is utilized in the opposite direction from the remote handset to the base unit.

For example, 64 kb/s μlaw encoding could be used in an audio direction from the base unit to the remote handset, while 32 kb/s ADPCM encoding (which raises the noise floor) could be correspondingly used in the opposite direction from the remote handset to the base unit.

This also makes sense from a power perspective where the transmitter of the base unit will be on longer for the higher rate data (e.g., the 64 kb/s μlaw data) while the transmitter of the remote handset, which is battery powered, can encode using the lower bit rate 32 kb/s ADPCM, shortening the ON duration of the remote handset as compared to that of the base unit.

Technique #2—Higher Complexity/Quality Encoder in

A higher complexity, higher quality speech encoder may be implemented in the base unit for the same bit rate as a lower complexity, lower quality speech encoder implemented in the remote handset.

For example, a 32 kb/s CELP encoder may be implemented in the base unit, while a 32 kb/s ADPCM encoder may be implemented in the remote handset. This again makes sense from a power perspective because the higher MIPs which translate to higher power are consumed in the encoder running in the base unit.

Technique #3—Implement Lower Quality Encoder in Remote Handset

Similar to technique #2, a lower quality A/D converter could be implemented in the remote handset as compared to that implemented in the base unit.

This has the potential of reducing the manufacturing cost of the remote handset as compared to that of the base unit.

FIG. 1 shows an exemplary digital cordless telephone including a base unit 561 and a corresponding remote handset 560, including an encoding scheme of a first type and/or bit rate in the remote handset 560 (with a corresponding decoder 539 in the base unit 561), and an encoding scheme of a second type and/or bit rate in the base unit 561 (with a corresponding decoder 581 in the remote handset 560, in accordance with the principles of the present invention.

FIG. 2A is a table listing exemplary encoding schemes, selected in accordance with the principles of the present invention.

In particular, in FIG. 2A, any appropriate encoding scheme such as CELP, RELP, μ-law (typically used in North America), A-law (typically used in Europe), pulse code modulation (PCM), ADPCM, etc. may be utilized in either audio path direction, either from the base unit to the remote handset, or from the remote handset to the base unit, with the understanding that generally speaking, the higher quality encoding scheme is selected for use in the base unit (and decoded at the remote handset) while the lesser quality (perhaps higher compression ratio and/or lower bit rate) encoding scheme is selected for use in the remote handset (and decoded at the base unit).

FIG. 2B is a table listing exemplary encoding schemes including different bit rates utilizing a same encoder type, selected in accordance with the principles of the present invention.

In particular, in FIG. 2B, a first encoding scheme for use in the path from the base unit to the remote handset might be, e.g., 32 kb/s CELP, while the second encoding scheme for use in the same path in the opposite direction from the remote handset to the base unit might be, e.g., 24 kb/s CELP, in accordance with the principles of the present invention. Of course, this is an example only, with many other bit rates and/or encoding algorithm types being possible, within the scope of the principles of the present invention.

While the invention has been described with reference to the exemplary embodiments thereof, those skilled in the art will be able to make various modifications to the described embodiments of the invention without departing from the true spirit and scope of the invention.

What is claimed is:

1. In a digital cordless telephone system, a full-duplex audio path, comprising:
   a base unit of said digital cordless telephone system comprising a telephone line interface;
   a remote handset paired to said base unit;
   an unbalanced coding scheme wherein digital audio transmitted in a first direction over said full-duplex audio path is encoded using a first encoding scheme different from a second encoding scheme used to encode digital audio transmitted over said full-duplex audio path in a second direction opposite said first direction;
   wherein said digital audio encoded using said first encoding scheme is transmitted in said first direction simultaneously with said digital audio encoded using said second encoding scheme being transmitted in said second direction.

2. In a digital cordless telephone system, the full-duplex audio path between a base unit and a remote handset according to claim 1, wherein:
   a first encoding algorithm of said first encoding scheme is different from a second encoding algorithm of said second encoding scheme.

3. In a digital cordless telephone system, the full-duplex audio path between a base unit and a remote handset according to claim 1, wherein:
   a bit rate of said first encoding scheme is different from a bit rate of said second encoding scheme.

4. In a digital cordless telephone system, the full-duplex audio path between a base unit and a remote handset according to claim 2, wherein:
   a bit rate of said first encoding scheme is substantially equal to a bit rate of said second encoding scheme.

5. In a digital cordless telephone system, the full-duplex audio path between a base unit and a remote handset according to claim 1, wherein:
   said first encoding scheme is provided in a base unit of said digital cordless telephone system; and
   said second encoding scheme is provided in a remote handset of said digital cordless telephone system.

6. In a digital cordless telephone system, the full-duplex audio path between a base unit and a remote handset according to claim 5, wherein said first encoding scheme comprises:
   uncompressed encoding.

7. In a digital cordless telephone system, the full-duplex audio path between a base unit and a remote handset according to claim 6, wherein said second encoding scheme comprises:
   ADPCM encoding.

8. In a digital cordless telephone system, the full-duplex audio path between a base unit and a remote handset according to claim 7, wherein:
   said ADPCM encoding has a bit rate of no greater than 32 kb/s.

9. In a digital cordless telephone system, the full-duplex audio path between a base unit and a remote handset according to claim 6, wherein said uncompressed encoding comprises:
   at least one of μ-law and A-law encoding at 64 kb/s.

10. A method of providing an unbalanced coding scheme in a digital cordless telephone, comprising:
    providing a first radio frequency bandwidth for transmission of encoded digitized audio data from a base unit to a paired remote handset, said base unit comprising a telephone line interface; and providing a second radio frequency bandwidth different from said first radio frequency bandwidth, for transmission of encoded digitized audio data from said remote handset to said base unit;

wherein said first radio frequency bandwidth is utilized simultaneously with said second radio frequency bandwidth.

11. The method of providing an unbalanced coding scheme in a digital cordless telephone according to claim 10, wherein:

said first radio frequency bandwidth is significantly larger than said second radio frequency bandwidth.

12. Apparatus for providing an unbalanced coding scheme in a digital cordless telephone, comprising:

means for providing a first radio frequency bandwidth for transmission of encoded digitized audio data from a base unit to a paired remote handset, said base unit comprising a telephone line interface; and means for providing a second radio frequency bandwidth different from said first radio frequency bandwidth, for transmission of encoded digitized audio data from said remote handset to said base unit;

wherein said first radio frequency bandwidth is utilized simultaneously with said second radio frequency bandwidth.

13. The apparatus for providing an unbalanced coding scheme in a digital cordless telephone according to claim 12, wherein:

said first radio frequency bandwidth is significantly larger than said second radio frequency bandwidth.

14. A digital cordless telephone system, comprising:

a base unit having an audio encoding scheme of a first type; and a remote handset paired to said base unit, said remote handset adapted to use an audio encoding scheme of a second type different from said first type; and wherein said digital cordless telephone system is operable to utilize said audio encoding scheme of said first type simultaneously with said audio encoding scheme of said second type.

15. The digital cordless telephone system according to claim 14, wherein:

said first type encoding scheme in said base unit has a faster bit rate than said second type encoding scheme in said remote handset.

16. The digital cordless telephone system according to claim 14, wherein:

said first type encoding scheme comprises one of A-law and u-law; and said second type encoding scheme comprises one of ADPCM and CELP.

17. In a digital cordless telephone system, a full-duplex audio path between a base unit comprising a telephone line interface paired to a remote handset, comprising:

an unbalanced coding scheme relied on by said base unit and said remote handset wherein digital audio transmitted in a first direction over said full-duplex audio path is encoded using a first analog-to-digital conversion precision different from a second analog-to-digital conversion precision used to encode digital audio transmitted over said full-duplex audio path in a second direction opposite said first direction;

wherein said digital audio encoded using said first analog-to-digital conversion precision is transmitted in said first direction simultaneously with said digital audio encoded using said second analog-to-digital conversion precision being transmitted in said second direction.

18. In a digital cordless telephone system, the full-duplex audio path between a base unit and a remote handset according to claim 17, wherein:

said first analog-to-digital precision is 12 bits or fewer; and said second analog-to-digital precision is greater than 12 bits.

19. In a digital communications system, a full-duplex audio path between two devices communicating with one another, comprising:

an unbalanced coding scheme wherein digital audio transmitted in a first direction over said full-duplex audio path is encoded using a first encoding scheme different from a second encoding scheme used to encode digital audio transmitted over said full-duplex audio path in a second direction opposite said first direction;

wherein said digital audio encoded using said first encoding scheme is transmitted in said first direction simultaneously with said digital audio encoded using said second encoding scheme being transmitted in said second direction.

20. In a digital communications system according to claim 19, wherein:

a first encoding algorithm of said first encoding scheme is different from a second encoding algorithm of said second encoding scheme.

21. In a digital communications system according to claim 19, wherein:

a bit rate of said first encoding scheme is different from a bit rate of said second encoding scheme.

22. In a digital communications system according to claim 20, wherein:

a bit rate of said first encoding scheme is substantially equal to a bit rate of said second encoding scheme.

23. In a digital communications system according to claim 19, wherein:

said first encoding scheme is provided in a base unit of a cellular network; and said second encoding scheme is provided in a mobile handset of said cellular network.

24. In a digital communications system according to claim 23, wherein said first encoding scheme comprises: uncompressed encoding.

25. In a digital communications system according to claim 24, wherein said second encoding scheme comprises: ADPCM encoding.

26. In a digital communications system according to claim 25, wherein:

said ADPCM encoding has a bit rate of no greater than 32 kb/s.

27. In a digital communications system according to claim 24, wherein said uncompressed encoding comprises: at least one of μ-law and A-law encoding at 64 kb/s.

* * * * *